(12) United States Patent
Almond et al.

(10) Patent No.: US 8,486,249 B2
(45) Date of Patent: Jul. 16, 2013

(54) COLD SPRAY AND ANODIZATION REPAIR PROCESS FOR RESTORING WORN ALUMINUM PARTS

(75) Inventors: Bruce Almond, Phoenix, AZ (US); Geoge Golna, Chandler, AZ (US); Calum Macintyre, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1205 days.

(21) Appl. No.: 12/362,081

(22) Filed: Jan. 29, 2009

(65) Prior Publication Data

US 2010/0187119 A1    Jul. 29, 2010

(51) Int. Cl.
    *C25D 11/04*    (2006.01)
(52) U.S. Cl.
    USPC .......... 205/115; 205/109; 205/324; 427/142; 427/192
(58) Field of Classification Search
    USPC ........................................... 205/115
    See application file for complete search history.

(56) References Cited

U.S. PATENT DOCUMENTS

| 5,302,414 | A  | * | 4/1994  | Alkhimov et al. ........... 427/192 |
| 6,491,208 | B2 | * | 12/2002 | James et al. ................. 228/119 |
| 6,780,458 | B2 | * | 8/2004  | Seth et al. ................... 427/201 |
| 7,207,373 | B2 |   | 4/2007  | Parkos, Jr. et al. |
| 7,334,625 | B2 |   | 2/2008  | Judge et al. |
| 2005/0221110 | A1 | * | 10/2005 | Fujita et al. .................. 428/653 |
| 2006/0086479 | A1 | * | 4/2006  | Parkos et al. ................ 164/369 |
| 2006/0093736 | A1 | * | 5/2006  | Raybould et al. ............ 427/180 |
| 2006/0134320 | A1 | * | 6/2006  | DeBiccari et al. ........... 427/140 |
| 2006/0240192 | A1 | * | 10/2006 | Raybould et al. ............ 427/367 |
| 2007/0227683 | A1 | * | 10/2007 | Judge et al. .................... 164/28 |
| 2008/0265218 | A1 | * | 10/2008 | Lifchits ......................... 252/503 |
| 2009/0011123 | A1 | * | 1/2009  | Bunting et al. ............... 427/142 |
| 2009/0148622 | A1 | * | 6/2009  | Stoltenhoff et al. ......... 427/554 |
| 2009/0301328 | A1 | * | 12/2009 | Zahiri et al. .................. 101/375 |
| 2010/0119707 | A1 | * | 5/2010  | Raybould et al. ............ 427/185 |
| 2010/0155251 | A1 | * | 6/2010  | Bogue et al. ..................... 205/81 |

FOREIGN PATENT DOCUMENTS

WO    WO 2007098885 A1 *  9/2007
WO       2008052347 A1    5/2008

* cited by examiner

*Primary Examiner* — Jonathan Johnson
*Assistant Examiner* — Bryan D. Ripa
(74) *Attorney, Agent, or Firm* — Ingrassia Fisher & Lorenz, P.C.

(57) ABSTRACT

A method for repairing an aluminum part having a worn portion is provided. In one embodiment, the method includes the steps of: (i) producing a first substantially non-porous coating over the worn portion utilizing a cold spray process wherein a powder mixture is propelled against the worn portion of the aluminum part, and (ii) anodizing the aluminum part to grow an aluminum oxide layer overlaying the first substantially non-porous coating. The powder mixture includes aluminum and an alloy media.

8 Claims, 4 Drawing Sheets

COLD SPRAY AND ANODIZATION REPAIR PROCESS FOR RESTORING WORN ALUMINUM PARTS

TECHNICAL FIELD

The present invention relates generally to aluminum component repair and, more particularly, to a cold spray and anodization repair process suitable for restoring worn or corroded aluminum parts.

BACKGROUND

Aluminum components are commonly employed in a variety of industries due to their relatively high strength, machinability, low weight, and other desirable characteristics. In the avionics industry, for example, lightweight aluminum parts are routinely utilized within lubrication and valve systems deployed onboard aircraft. Often, the aluminum part is anodized to create a relatively hard, corrosion-resistant outer coating of aluminum oxide. However, even when anodized, aluminum parts are relatively prone to wear due to, for example, abrasion with neighboring components. Wear may be especially problematic in high vibratory environments, such as those found aboard aircraft. Extensive wear may necessitate repair or replacement of the aluminum part.

Although frequently utilized to repair and rebuild non-anodized aluminum components, conventional thermal spray processes are generally unsuitable for repairing aluminum parts that are subsequently anodized. This is largely because the coating produced by such thermal spray processes is relatively porous. If the thermally-sprayed aluminum part is subjected to anodization, acid from the electrolytic bath may leach into the pores of the sprayed coating and corrode the underlying material. As a result of this corrosion, the anodized areas of the aluminum part may crumble and separate thereby rendering any repairs ineffective.

In general, anodized aluminum components having very slight or superficial wear (e.g., characterized by grooves or scratching having a scratch depth of approximately 0.001 inch/0.0254 mm or less) may be repaired utilizing an anodizing process; and anodized aluminum components having more moderate wear (e.g., characterized by grooves or scratching in excess of 0.001 inch/0.0254 mm and less than 0.010 inch/0.254 mm) may be repaired via application of a filler material, such as epoxy. Notably, when anodized aluminum parts having moderate wear are repaired utilizing a filler material, the filler material will typically wear away more quickly than the aluminum parent material; thus, anodized aluminum parts repaired utilizing a filler material will typically be less durable than an original aluminum part or an aluminum part repaired via anodizing. Anodized aluminum components having extensive wear (e.g., characterized by pitting or by scratches having a scratch depth exceeding approximately 0.010 inch/0.254 mm) are generally unable to be repaired and thus require replacement.

Considering the above, it would be desirable to provide a method for repairing an anodized aluminum part having moderate to extensive wear; e.g., wear generally characterized by pitting or scratching having a scratch depth exceeding approximately 0.001 inch/0.0254 mm. Ideally, such a method would produce a hard, durable outer coating over the previously-worn portion of the aluminum part to increase the operational lifespan of the repaired aluminum part. It would also be desirable for such a method to be relatively straightforward and inexpensive to implement. Other desirable features and characteristics of the present invention will become apparent from the subsequent Detailed Description and the appended claims, taken in conjunction with the accompanying drawings and this Background.

BRIEF SUMMARY

There is provided a method for repairing an aluminum part having a worn portion. In one embodiment, the method includes the steps of: (i) producing a first substantially non-porous coating over the worn portion utilizing a cold spray process wherein a powder mixture is propelled against the worn portion of the aluminum part, and (ii) anodizing the aluminum part to grow an aluminum oxide layer overlaying the first substantially non-porous coating. The powder mixture includes aluminum and an alloy media.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. FIGS. 3-7 and 9-11 are not drawn to scale.

Figure 1:
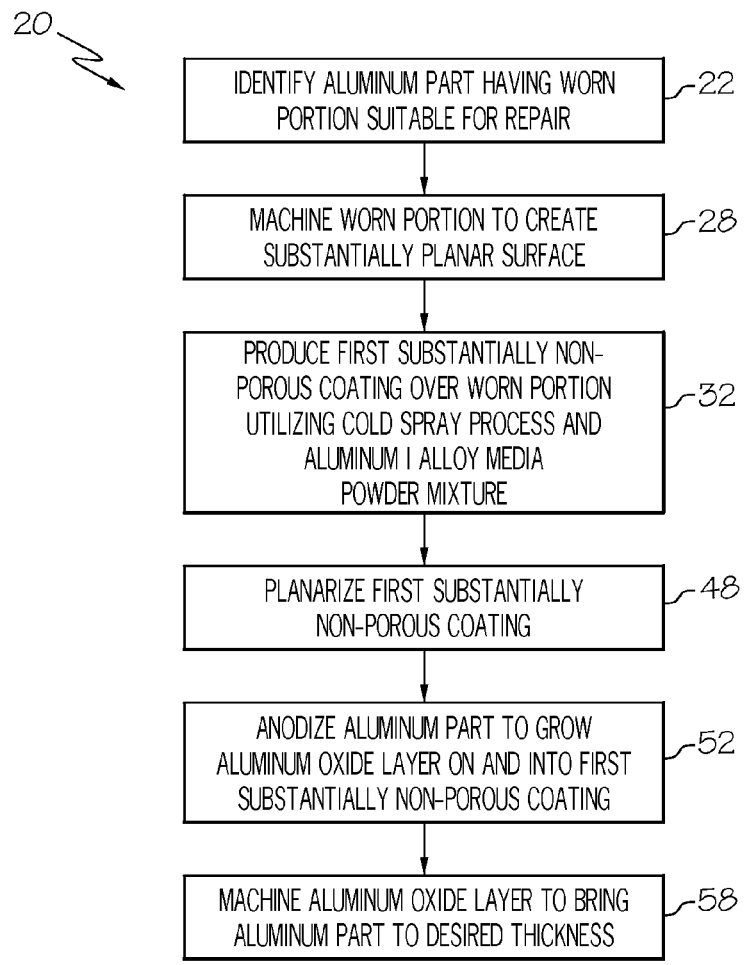
FIG. 1 is a flowchart illustrating a cold spray and anodization process suitable for repairing a worn or corroded aluminum part in accordance with a first exemplary embodiment.

FIG. 1 is a flowchart illustrating a cold spray and anodization process 20 suitable for repairing a worn or corroded aluminum part in accordance with a first exemplary embodiment. To commence (STEP 22), an aluminum part having a worn portion suitable for repair is identified. During this step, the worn portion of the aluminum part may be visually inspected and measured (e.g., utilizing a depth gauge) to determined the superficiality and type of wear. If the worn portion is generally characterized by grooves or scratches, and if the scratch depth is not in excess of a predetermined threshold (e.g., approximately 0.001 inch/0.0254 mm), then the aluminum part may be repaired utilizing an anodizing process, such as the hardcoat anodizing process described below. However, if the worn portion is generally characterized by scratching having a scratch depth greater than the predetermined threshold, or if the worn portion is generally characterized by pitting, the aluminum part may instead be repaired utilizing cold spray and anodization process 20 shown in FIG. 1.

Figure 2:
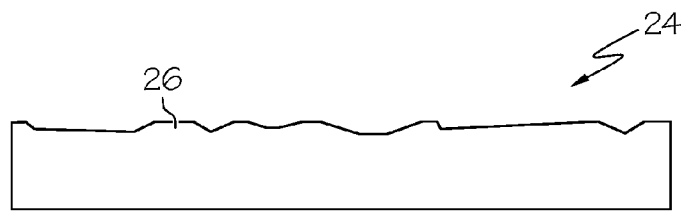
FIGS. 2-7 are simplified cross-sectional views of a generic aluminum component illustrating the various steps of the exemplary cold spray and anodization process shown in FIG. 1.
Figure 3:
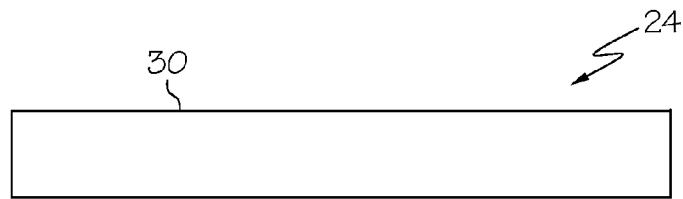

FIG. 2 is a simplified cross-sectional view of an aluminum part 24 having a worn portion 26 that may be deemed suitable for repair utilizing process 20 (FIG. 1); e.g., upon inspection, it may be determined that worn portion 26 is scratched as a result of abrasion with a neighboring component and has a scratch depth of, for example, 0.005 inch/0.127 mm. Aluminum part 24 is illustrated as a generic block in FIG. 2 to emphasize that a wide variety of aluminum parts may be repaired utilizing cold spray and anodization process 20. In one embodiment, aluminum part 24 assumes the form of a port plate included within an oil lubrication system of the type commonly deployed on an aircraft and utilized to lubricate a gearbox mechanically coupled to the spool of a gas turbine engine.

Figure 4:
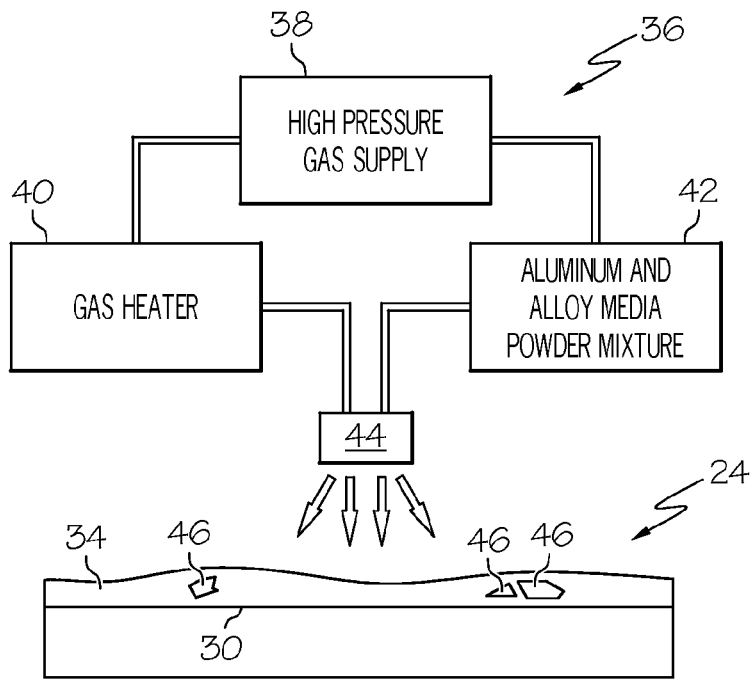
Figure 5:
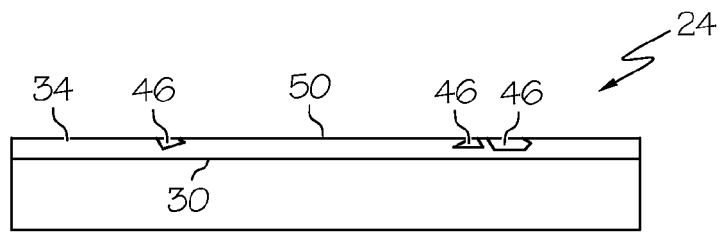

Next, at STEP 28 (FIG. 1), the worn portion of the aluminum part is machined to create a substantially planar surface. For example, and with reference to FIG. 3, worn portion 26 of aluminum part 24 may be ground to remove a predetermined thickness (e.g., approximately 0.002 inch/0.0508 mm) from worn portion 26 (FIG. 2) and yield a substantially planar surface 30. After planarizing worn portion 26 of aluminum part 24 in this manner, a cold spray process is utilized to deposit a cold spray coating over substantially planar outer surface 30 (STEP 32). More specifically, and as illustrated in FIG. 4, a cold spray coating 34 may be deposited over substantially planar surface 30 utilizing a cold spray apparatus 36. In the illustrated example, cold spray apparatus 36 includes a high pressure gas supply 38, a gas heater 40, a powder hopper or feeder 42, and a cold spray gun 44. Cold spray apparatus 36 will include additional components (e.g., a controller) that are conventional and not shown in FIG. 4 for clarity. Gas heater 40 and powder feeder 42 are each fluidly coupled between high pressure gas supply 38 and cold spray gun 44. During operation of cold spray apparatus 36, high pressure gas supply 38 supplies a compressed carrier gas (e.g., helium) to gas heater 40, which heats the carrier gas to increase its pressure. As the term "cold spray" implies, gas heater 40 heats the carrier gas to temperatures that are considerably less than the temperatures associated with conventional thermal spray processes, which commonly approach 5,000° Fahrenheit (2760° Celsius). The heated carrier gas is then directed into the cold spray gun 44. At the same time, powder feeder 42 feeds a powder mixture containing relatively fine particles (e.g., approximately 1 to 50 μm in diameter) into cold spray gun 44. The powder particles are introduced into the carrier gas, which cools rapidly within cold spray gun 44. As a result of this cooling, the carrier gas, and the powder particles entrained therein, accelerate to supersonic speeds (e.g., approximately 500-1200 m/s) as they exit the nozzle of cold spray gun 44. A technician moves cold spray gun 44, typically in a sweeping motion, such that the powder particles impinge different areas of substantially planar surface 30 of aluminum part 24. When striking substantially planar surface 30, a certain percentage of the powder particles deform and bond both to substantially planar surface 30 and to one another to create cold spray coating 34 overlaying surface 30.

Notably, cold spray coating 34 is relatively dense and non-porous; e.g., in a preferred embodiment, cold spray coating 34 is deposited to have a porosity less than approximately 1%. Thus, in contrast to the relatively porous coating produced by conventional thermal spray coating processes, cold spray coating 34 will generally prevent the ingress of acid during subsequent anodization processes, including the hardcoat anodization process described below. To further emphasize this point, cold spray coating 34 may be referred to as "substantially non-porous cold spray coating 34" or simply "substantially non-porous coating 34" herein. In one embodiment, substantially non-porous coating 34 is deposited to a thickness of approximately 0.015 inch/0.381 mm.

As indicated in FIG. 4, the powder mixture utilized to create substantially non-porous coating 34 during STEP 32 (FIG. 1) includes aluminum and an alloy media The media may comprise any material or materials that, in particulate or granular form: (i) generally does not chemically bond with the aluminum powder, and (ii) physically drives the aluminum powder particles against substantially planar surface 30 to compact substantially non-porous coating 34 during the cold spray process as described more fully below. A non-exhaustive list of suitable alloy media includes various metal oxides (e.g., zirconium oxide), carbides (e.g., tungsten carbide, silicon carbide, etc.), and the like. These examples notwithstanding, it is generally preferred that the alloy media comprises an aluminum oxide powder. For this reason, the following will describe the creation of non-porous coating 34 utilizing an aluminum-aluminum oxide powder mixture; however, it should be appreciated that the following description is equally applicable to aluminum powder mixtures containing other types of alloy media. The particular shape assumed by the alloy media particles will generally be determined by the particular type of material selected for use during STEP 32; e.g., if aluminum oxide powder is utilized as the alloy media, the particles will generally be characterized by a block-like geometry.

As will be readily appreciated by the skilled artisan, aluminum oxide will not grow directly over or into pre-existing aluminum oxide particles (and other such alloy media) during anodization. Thus, the inclusion of aluminum oxide within the powder mixture, and the consequent inclusion of aluminum oxide particles within substantially non-porous coating 34 (shown in FIG. 4 at 46), will interfere with the uniform growth of an outer aluminum oxide layer during the hardcoat anodization described below. This notwithstanding, the present inventors have discovered that inclusion of aluminum oxide within the powder mixture improves the adherence of the aluminum powder to substantially planar surface 30 and also increases the density of the resulting cold spray coating. Without being bound by theory, this is believed to be because the larger aluminum oxide particles have a greater kinetic energy when striking substantially planar surface 30 and the outer surface of coating 34. The aluminum oxide particles thus serve to physically drive the aluminum particles against substantially planar surface 30 thereby further compacting substantially non-porous coating 34. In addition, the aluminum oxide particles help minimize blockage build-up within the nozzle of cold spray gun 44. For this reason, in preferred embodiments of the inventive method, substantially non-porous cold spray coating 34 is produced utilizing an aluminum-aluminum oxide powder mixture containing approximately 5% to approximately 40% aluminum oxide (or other such alloy media), by weight of the powder mixture. Furthermore, in one preferred embodiment, cold spray coating 34 is produced utilizing an aluminum-aluminum oxide powder mixture containing approximately 20% aluminum oxide, by weight of the powder mixture.

It should be noted that, although it is generally desirable that the outer surface of cold spray coating 34 is relatively smooth in texture, this may not always be the case. In certain embodiments, it may be desirable to increase the percentage of aluminum oxide contained within the powder mixture to enhance the roughness of substantially non-porous surface 30 due to the desired application for aluminum part 24; e.g., if aluminum part 24 is utilized within an oil lubrication system, the roughening of substantially non-porous surface 30 may improve the oil retention properties thereof. It should also be noted that the particles of aluminum contained within the powder mixture will more readily bond to surface 30 than will the aluminum oxide particles. As a result, the ratio of aluminum-to-aluminum oxide within substantially non-porous coating cold spray 34 will be greater than the ratio of aluminum-to-aluminum oxide (or other alloy media) contained within the powder mixture utilized to create coating 34; e.g., if a powder mixture including 40% aluminum oxide, by weight, is utilized during STEP 32, cold spray coating 34 may only contain 10% to 20% aluminum oxide when formed.

Due to the nature of the cold spray process, substantially non-porous cold spray coating 34 will typically have an uneven or undulating outer surface. Thus, during STEP 48 of process 20 (FIG. 1), substantially non-porous coating 34 may be planarized. For example, and with reference to FIG. 5, substantially non-porous coating 34 may undergo a lapping process to impart a substantially planar outer surface 50 to coating 34. In one example, approximately 0.005 inch/0.127 mm of the thickness of substantially non-porous cold spray coating 34 is removed during STEP 48 thereby leaving coating 34 with a total thickness of approximately 0.010 inch/0.254 mm.

Next, during STEP 52 (FIG. 1), aluminum part 24 undergoes a Type III hardcoat anodization process (often referred to simply as "hard anodizing") to grow an aluminum oxide layer overlying substantially non-porous coating 34. Hard anodizing process procedures suitable for performance during STEP 52 are well-established. In one known hardcoat anodization process, the aluminum part (e.g., aluminum part 24) is first submerged in an electrolytic solution, such as a sulfuric acid bath. A current having a relatively high density is applied through the aluminum part for a time period sufficient to grow the aluminum oxide film to a desired thickness. Approximately half of the aluminum oxide layer grows above substantially planar surface 50 of coating 34; and approximately half of the aluminum oxide layer penetrates into substantially non-porous coating 34, and thus grows below, surface 50 of coating 34. Relative to Type I or II anodizing, hard anodizing creates a thicker, more durable outer coating of aluminum oxide. This notwithstanding, Type I or II anodizing may be performed during STEP 52 in lieu of hard anodizing in alternative embodiments.

Figure 6:
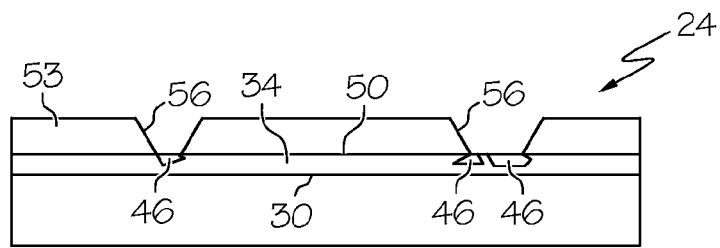

FIG. 6 illustrates aluminum part 24 including an outer aluminum oxide layer 53 formed during hard anodizing. FIG. 6 is not drawn to scale, and outer aluminum oxide layer 53 is enlarged for clarity. In this example, aluminum oxide layer 53 is grown over and into substantially non-porous cold spray coating 34; consequently, approximately half of the thickness of aluminum oxide layer 53 resides above the outer surface of coating 34 and approximately half of the thickness resides below the outer surface of coating 34. As a non-limiting example, aluminum oxide layer 53 may be grown to have a total thickness of approximately 0.004 inch/0.1016 mm. As noted above, aluminum oxide will not grow directly over other aluminum oxide particles during anodization. As a result, voids 56, which typically have a frustoconical or funnel-like geometry, are created in aluminum oxide layer 53 above the aluminum oxide particles 46 embedded within substantially non-porous cold spray coating 34.

Figure 7:
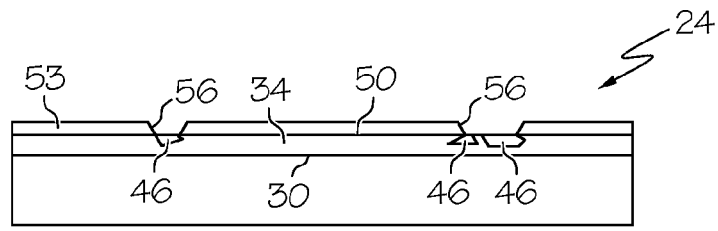

During the final processing step of cold spray and anodization process 20 (i.e., STEP 58 shown in FIG. 1), aluminum oxide layer 53 may be machined (e.g., lapped with a polishing compound) to bring aluminum part 24 to a desired thickness. Machining may also be performed to impart a substantially planar outer surface to aluminum oxide layer 53 and/or to decrease the cumulative surface area of voids 56 exposed through the outer surface of layer 53. FIG. 7 illustrates aluminum part 24 after planarization of aluminum oxide layer 53. Process 20 is thus completed, and aluminum part 24 is fully restored. Advantageously, due to the dense and durable aluminum oxide layer produced during the hardcoat anodization process, restored aluminum part 24 may have an operational life equal to or greater than an identical aluminum part that has not undergone process 20. In the above-described exemplary embodiment, outer aluminum oxide layer 53 was grown over and into substantially non-porous aluminum-aluminum oxide layer; however, in alternative embodiments of the cold spray and anodization process, one or more intervening layers or coatings may be formed between the outer aluminum oxide layer and the substantially non-porous cold spray coating. One such alternative embodiment is described below in conjunction with FIGS. 8-11.

Figure 8:
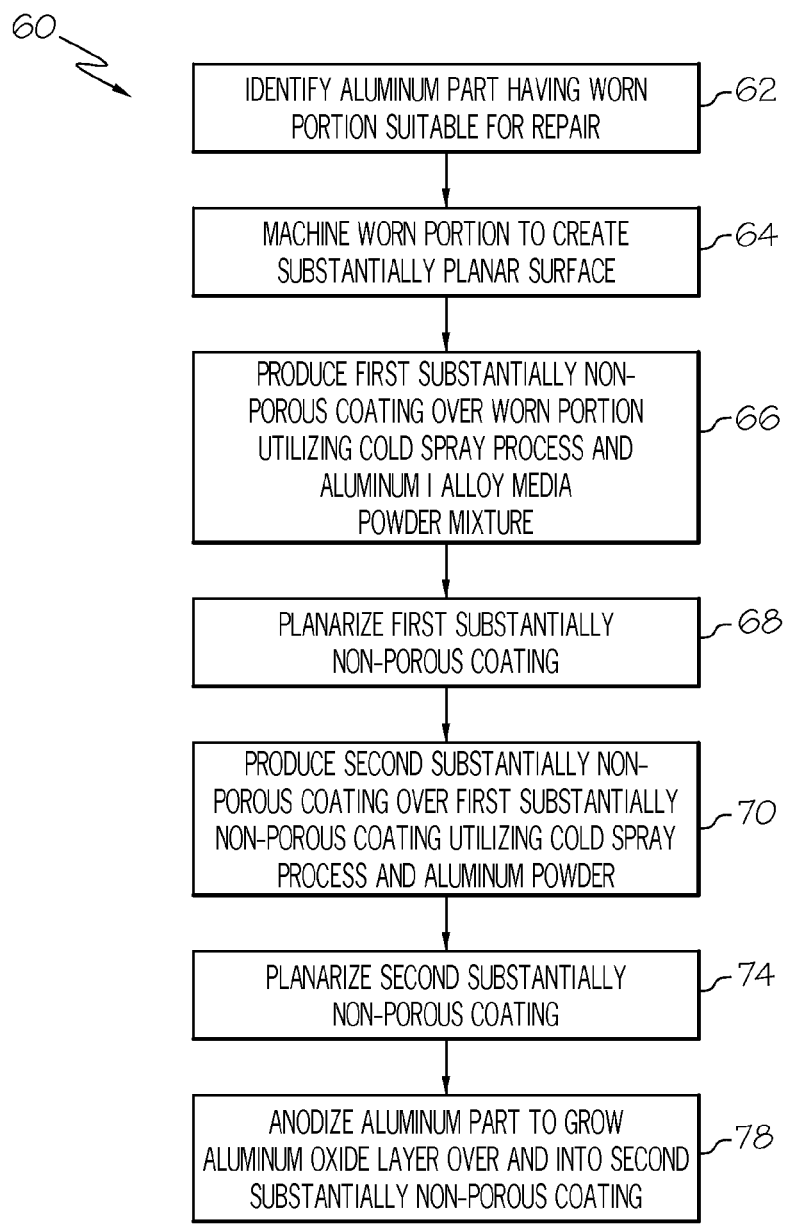
FIG. 8 is a flowchart illustrating a cold spray and anodization process suitable for repairing a worn or corroded aluminum part in accordance with a second exemplary embodiment.

FIG. 8 is a flowchart illustrating a cold spray and anodization process 60 in accordance with a second exemplary embodiment. The first four steps of process 60 (i.e., STEPS 62, 64, 66, and 68) are similar to or the same as the first four steps of process 20 (i.e., STEPS 22, 28, 32, and 48, respectively) and generally correspond to previously-discussed FIGS. 2, 3, 4, and 5, respectively. Thus, to avoid redundancy, STEPS 62, 64, 66, and 68 will not be described in detail at this time. However, it is noted that, during STEP 66, a "first" substantially non-porous coating is formed over the substantially planar surface of the aluminum component produced during the previous process step (i.e., STEP 64). The "first" substantially non-porous coating generally corresponds to substantially non-porous coating 34 formed over substantially planar surface 30 of aluminum part 24 shown in FIG. 5. Substantially non-porous coating 34 is referred to as a "first" non-porous coating in this context to indicate that a second non-porous coating will be deposited over first non-porous coating 34 as described below. As previously stated, it is preferred that the aluminum-alloy media powder mixture utilized to form first substantially non-porous coating 34 contains approximately 5% to approximately 40% alloy media (e.g., aluminum oxide), by total weight of the powder mixture.

Figure 9:
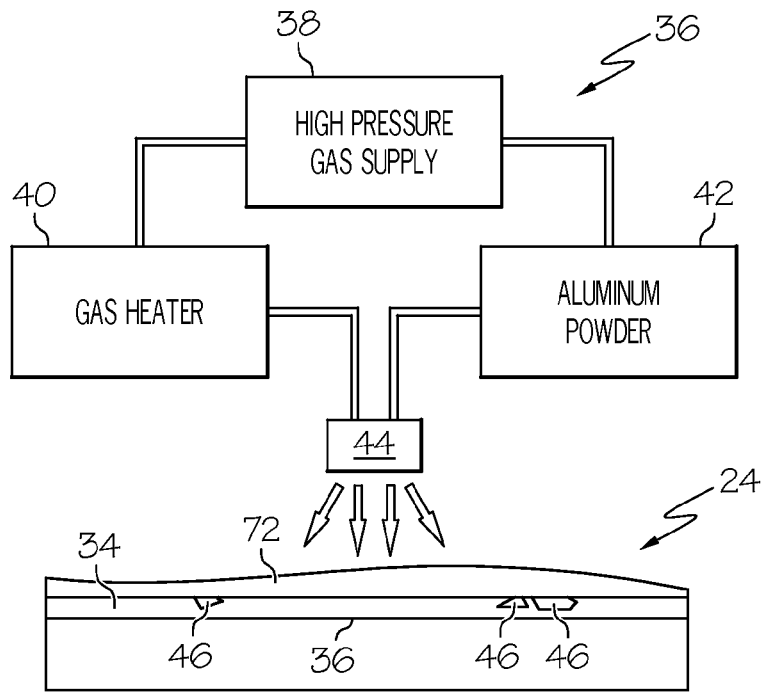
FIGS. 9-11 are simplified cross-sectional views of a generic aluminum component illustrating certain steps included within the exemplary cold spray and anodization process shown in FIG. 8.

After planarizing first substantially non-porous cold spray coating 34 (STEP 68), a second substantially non-porous coating is deposited over coating 34 (STEP 70). FIG. 9 illustrates aluminum part 24 after the deposition of a second substantially non-porous coating 72 over first substantially non-porous coating 34. As indicated in FIG. 9, second substantially non-porous coating 72 may be applied utilizing cold spray apparatus 36 described above in conjunction with FIG. 4. In contrast to first substantially non-porous coating 34, which is produced utilizing an aluminum-aluminum oxide powder mixture, second substantially non-porous coating 72 is produced utilizing an aluminum powder. The aluminum alloy powder is preferably substantially free of alloy media, such as aluminum oxide powder. As define herein, an aluminum powder is "substantially free" of alloy media (e.g., aluminum oxide) if the aluminum alloy powder contains less than approximately 0.5% alloy media, by total weight of the powder. The aluminum powder may consist essentially of pure aluminum; however, in a preferred group of embodiments, the aluminum powder comprises an aluminum alloy powder. In one specific embodiment, the aluminum alloy powder comprises approximately 50% to approximately 90% aluminum chemically bonded with approximately 10% to approximately 50% silicon, by total weight of the powder. In a more preferred embodiment, the aluminum alloy powder comprises approximately 88% aluminum chemically bonded with approximately 12% silicon, by total weight of the powder mixture. Second substantially non-porous coating 72 may be deposited to a thickness of, for example, approximately 0.002-0.003 inch (approximately 0.0508-0.0762 mm).

Figure 10:
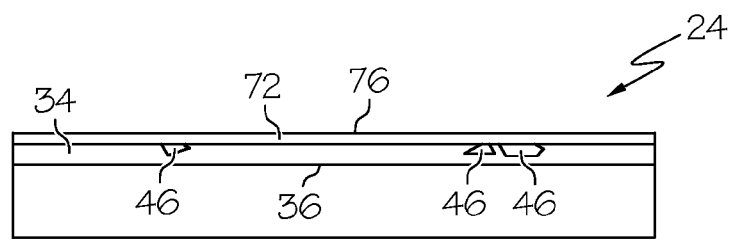
Figure 11:
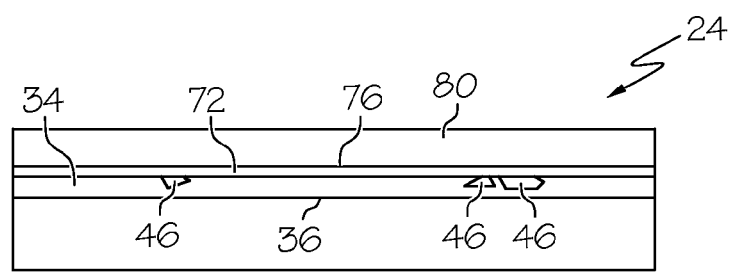

Next, at STEP 74 (FIG. 8), a second substantially non-porous coating 72 is planarized to yield a substantially planar outer surface, such outer surface 76 shown in FIG. 10. Lastly, to complete process 60 (FIG. 8), aluminum part 24 is anodized to grow an aluminum oxide layer overlaying second non-porous coating 72 (STEP 78) As illustrated in FIG. 11, anodization of aluminum part 24 results in the growth of an outer aluminum oxide layer 80 over and into second substantially non-porous coating 72. As was the case previously, aluminum oxide layer 80 is enlarged in FIG. 11 for clarity. It is preferred, although by no means necessary, that a Type III hardcoat anodization is performed during STEP 78 to produce outer aluminum oxide layer 80. Outer aluminum oxide layer 80 overlays, but does not contact, first substantially non-porous coating 34 due to the presence of second substantially non-porous coating 34. The aluminum oxide particles 46 contained within non-porous coating 34 are covered by second substantially non-porous coating 34; thus, as may be appreciated by comparing FIG. 11 to FIG. 6, aluminum oxide particles 46 do not interfere with the uniform growth of outer aluminum oxide layer 80 (i.e., voids 56 shown in FIGS. 6 and 7 are not created within aluminum oxide layer 80). Process 60 thus results in a fully restored aluminum part 24 having a relatively smooth and durable outer oxide layer. If desired, outer aluminum oxide layer 80 may also be machined (e.g., polished or lapped) after formation to bring aluminum part 24 to a desired thickness and/or to planarized the outer surface of aluminum oxide layer 80.

The foregoing has thus provided two exemplary methods suitable for repairing an anodized aluminum part having moderate to extensive wear; e.g., wear generally characterized by pitting or scratching having a scratch depth exceeding approximately 0.001 inch/0.0254 mm. Performance of either exemplary method yields a hard, durable outer coating over the previously-worn portion of the aluminum part to increase the operational lifespan of the repaired component. As a further advantage, the above-described exemplary repair methods are relatively straightforward and inexpensive to implement. Although described above in the context of restoring an aluminum part (e.g., a port plate included within an aircraft oil lubrication system) damaged by abrasion, the above-described repair methods may also be utilized to repair aluminum parts damaged by corrosion. Periodic cleaning steps may also be performed at various intervals during the above-described processes; however, such cleaning steps are well-known and are not described herein in the interests of concision. Finally, it should be noted that, in the context of this Application, the term "overlay" denotes that the "overlaying" layer or coating (e.g., aluminum oxide layer 53 shown in FIGS. 6 and 7 or aluminum oxide layer 80 shown in FIG. 11) is formed at least partially over an "underlying" layer or coating (e.g., substantially non-porous cold spray coating 34 shown in FIGS. 4-7 or substantially non-porous coating 34 shown in FIGS. 9-11), whether or not the overlaying layer physically contacts the underlying layer (e.g., due to the presence of an intervening layer, such as substantially non-porous cold spray coating 72 shown in FIGS. 10 and 11); thus, the overlaying layer or coating (e.g., aluminum oxide layer 53 shown in FIGS. 6 and 7) is considered to overlay the underlying layer or coating (e.g., substantially non-porous coating 34 shown in FIGS. 4-7) even when a portion of the overlaying layer is grown into the underlying layer.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for repairing an aluminum part having a worn portion, the method comprising:
   producing a first substantially non-porous coating over the worn portion utilizing a cold spray process wherein a powder mixture is propelled against the worn portion of the aluminum part, the powder mixture containing at least one of pure aluminum and an aluminum alloy and further containing about 5% to about 40% aluminum oxide, by weight of the powder mixture, such that the first substantially non-porous coating produced pursuant to the cold spray process has aluminum oxide particles embedded therein;
   depositing a second substantially non-porous coating over the first substantially non-porous coating by cold spraying an aluminum powder thereon, the aluminum powder cold sprayed onto the first substantially non-porous coating substantially free of aluminum oxide; and
   hard anodizing the aluminum part to grow an aluminum oxide layer overlaying the second substantially non-porous coating.

2. A method according to claim 1 wherein the step of hard anodizing comprises growing the aluminum oxide layer over and into the first substantially non-porous coating such that voids are formed in the aluminum oxide layer over the aluminum oxide particles embedded in the first substantially non-porous coating and located near an outer surface thereof.

3. A method according to claim 1 wherein the step of hard anodizing comprises growing the aluminum oxide layer over and into the second substantially non-porous coating.

4. A method according to claim 1 wherein the first substantially non-porous coating is deposited to have a porosity less than approximately 1%.

5. A method according to claim 1 further comprising machining the aluminum part to create a substantially planar surface over the worn portion, the step of machining performed prior to the step of utilizing a cold spray process.

6. A method according to claim 5 further comprising planarizing the first substantially non-porous coating, the step of planarizing performed prior to the step of anodizing.

7. A method for repairing an aluminum part having a worn portion, the method comprising:
   machining the worn portion to produce a substantially planar surface;
   cold spraying a first powder onto the substantially planar surface to deposit a first substantially non-porous coating, the first powder containing at least one of an aluminum alloy and pure aluminum and further containing about 5% to about 40% of aluminum oxide, by weight of the first powder;
   cold spraying a second powder onto the first substantially non-porous coating to deposit a second substantially non-porous coating, the second powder comprising an aluminum-silicon alloy and containing less than about 0.5% aluminum oxide, by weigh of the second powder; and
   hard anodizing the aluminum part to grow an aluminum oxide layer over and into the second substantially non-porous coating.

8. A method according to claim 7 wherein the aluminum-silicon alloy comprises about 50% to about 90% aluminum and about 10% to about 50% silicon, by weight.

\* \* \* \* \*